April 5, 1966  J. D. TEAGUE  3,244,046
APPARATUS FOR SHEARING TRACK BOLTS OF CRAWLER-TYPE TRACTORS
Filed May 15, 1964
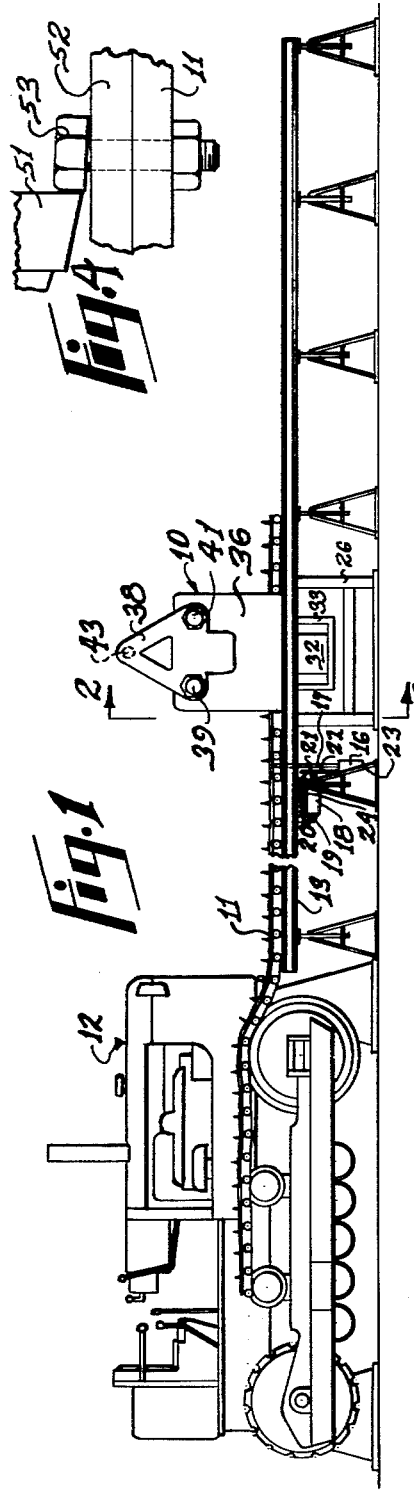
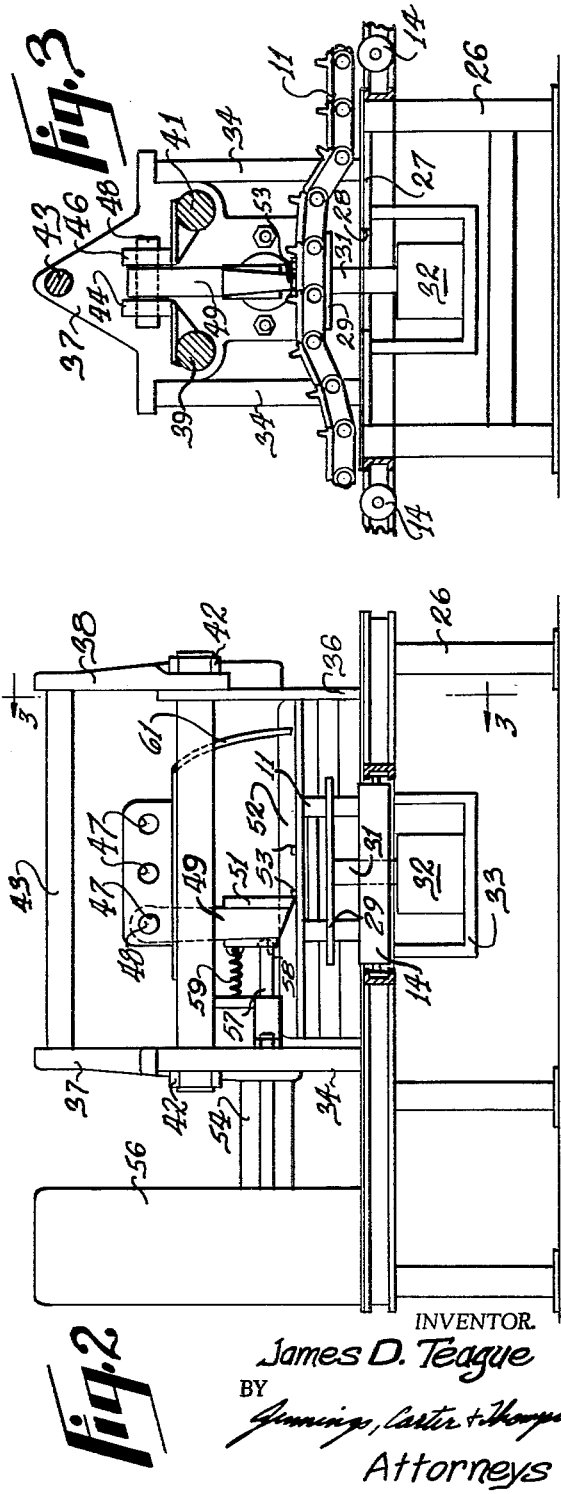
INVENTOR.
James D. Teague
BY
Jennings, Carter & Thompson
Attorneys ated Apr. 5, 1966

3,244,046
APPARATUS FOR SHEARING TRACK BOLTS OF CRAWLER-TYPE TRACTORS
James D. Teague, Rte. 7, Box 416, Oxford, Ala.
Filed May 15, 1964, Ser. No. 367,816
7 Claims. (Cl. 83—251)

This invention relates to apparatus for shearing track bolts of crawler-type tractors and more particularly to such apparatus which shall be adapted for shearing the head off a track shoe bolt carried by the track of a crawler-type tractor, thereby eliminating the necessity of cutting off the heads of the bolts with a torch or shearing the heads off by employing a sledge hammer and spike maul.

An object of my invention is to provide apparatus for shearing shoe bolts carried by the tracks of a crawler-type tractor which may be operated by a single operator and without any particular skill on his part.

Another object of my invention is to provide apparatus for shearing track shoe bolts of the character designated which shall be simple of construction, economical of manufacture and one which is adapted for removing track shoe bolts from all size tracks for crawler-type tractors.

As is well known in the art to which my invention relates, when new pins and bushings are to be installed or old ones turned in tracks for crawler-type tractors, the bolts which secure the track shoes to the track rail must be removed. These bolts can sometimes be removed with wrenches. However, if the bolt heads are worn, they must be removed by other means. Heretofore, such worn bolt heads have been removed by cutting off the heads with a torch or the heads have been sheared off by employing a sledge hammer and spike maul. Where a sledge and spike maul is employed, two men are required and the work is very difficult to perform. The torch method of removing the heads from the track shoe bolts is also time-consuming as well as expensive. Furthermore, where the torch is employed, the track shoes are often damaged due to the heat employed.

To overcome the above and other difficulties, I provide apparatus wherein a section of the track is held in a predetermined position. A movable shear member is mounted in position to move transversely of and adjacent the upper surface of the section of track supported in the predetermined position whereby upon imparting movement to the shear member transversely of the section of track, the head of a track shoe bolt projecting above the upper surface of the track in the path of movement of the shear member is sheared off. By providing means for intermittently advancing the track onto the support base for the section of track carrying the bolt to be sheared, the apparatus is very easily operated by a single operator and without damage to the track or track shoes carried thereby.

Apparatus embodying features of my invention is illustrated in the accompanying drawing, forming a part of this application, in which:

FIG. 1 is a side elevational view, partly broken away, showing the manner in which the track of a crawler-type tractor is introduced into my improved apparatus;

FIG. 2 is a sectional view taken generally along the line 2—2 of FIG. 1, parts of the track being omitted for the sake of clarity;

FIG. 3 is a sectional view taken generally along the line 3—3 of FIG. 2; and,

FIG. 4 is an enlarged, fragmental view showing the shear element engaging the head of a track bolt.

Referring now to the drawing for a better understanding of my invention, I show my shear apparatus indicated generally at 10 in position to receive the track 11 of a crawler-type tractor 12. The track 11 is supported by and transferred through the shear apparatus 10 by a roller conveyor 13 having a plurality of transverse rollers 14. The track 11 is moved along the roller conveyor 13 by conventional means, such as by mounting an air cylinder 16 beneath the roller conveyor 13 in position for its piston rod 17 to engage a track bushing of track 11 whereby the adjacent portion of the track is elevated. The track 11 is then moved forward by a hydraulic cylinder 18 which is pivotally mounted as at 19 to a depending bracket 20 carried by the conveyor 13, as shown in FIG. 1. The piston rod 21 of the cylinder 18 is pivotally connected to an upstanding bracket 22 carried by the cylinder 16 whereby the entire cylinder 16 and its piston rod pivots about its pivot point 23 upon actuation of cylinder 18. To return piston rod 21 to its original position, a tension spring 24 is interposed between the upper end of the bracket 21 and the depending bracket 20. By providing an air cylinder 16 and a hydraulic cylinder 18, both cylinders are actuated at the same time to cause forward movement of the track 11. That is, the operation of the air cylinder 16 being faster than the operation of the hydraulic cylinder 18, the piston rod 17 is extended to thereby elevate the adjacent section of the track 11 prior to forward movement of the bracket 22, together with the entire unit including the cylinder 16 and its piston rod 17.

The shear apparatus 10 comprises a supporting frame 26 having a horizontal plate 27 for supporting the track 11. An opening 28 is provided in the central portion of the plate 27, as shown in FIG. 3. Adapted for movement from a position in horizontal alignment with the plate 27 to an elevated position is a movable plate 29 carried by the upper end of a piston rod 31 which in turn is carried by an air cylinder 32. A generally U-shaped frame 33 is carried by the under surface of the supporting frame 26 in position to support the air cylinder 32. The plate 29 is thus in position to elevate a section of the track 11, as shown in FIG. 3, upon actuation of the air cylinder 32. Upon deenergizing the cylinder 32, the plate 29 returns to its original position which is flush with the supporting plate 27.

Upstanding support brackets 34 are mounted on the supporting frame 26 at one side of the plate 29 and an upstanding plate-like support member 36 is mounted on the supporting frame 26 adjacent the opposite side of the plate 29. Mounted adjacent the upper ends of the vertical support members 34 is a downwardly flaring support member 37. In like manner, secured to the upper end of the plate-like member 36 is a downwardly flaring support member 38.

Extending between and secured to the lower portions of the support members 37 and 38 are transverse bars 39 and 41, respectively. The ends of the bars 39 and 41 are secured in place by suitable nuts 42 which engage threaded ends provided on the ends of the rods 39 and 41, as shown in FIG. 2. A transverse brace 43 extends between and is secured to the upper ends of the support members 37 and 38, as shown.

Secured to and extending upwardly and inwardly of the rods 39 and 41 are brackets 44 and 46, respectively. Aligned, spaced apart openings 47 are provided in vertically extending portions of the brackets 44 and 46 for receiving a pin 48. Mounted for pivotal movement on the pin 48 is a depending arm 49 which carries a shear element 51 adjacent the lower end thereof. As shown in FIGS. 2 and 3, the shear element 51 is mounted in position to move adjacent the upper surface of a track shoe indicated generally at 52 of the track 11. As is well known, the track shoe 52 is secured to the track rails by bolts indicated at 53. Accordingly, the shear element 51 is mounted in position to engage the head of a bolt 53, as shown clearly in FIG. 4.

To move the arm 49 and the shear element 51 carried thereby transversely adjacent the upper surface of the shoe 52 of the track, I mount a fluid pressure operated cylinder 54 between the upstanding support members 34. One end of the cylinder 54 is supported by an upstanding housing 56 which may carry the control mechanism for my improved apparatus. Projecting outwardly of the cylinder 54 is a piston rod 57 which is operatively connected to the lower end of the arm 49, as shown in FIG. 2. Preferably, a recess 58 is provided in the lower portion of the arm 49 in position to receive the end of the piston rod 57 whereby upon actuation of the cylinder 54, the piston rod 57 is moved to the right, as viewed in FIG. 2, to thus shear the head off the bolt 53 which lies in the path of movement of the shear element 51. The lower end of the arm 49 is held in firm engagement with the free end of the piston rod 57 by a tension spring 59. Also, the tension spring 59 aids in returning the piston rod 57 to its original position after the cylinder has been deenergized. Track 11 is held in the predetermined position by engagement thereof with the adjacent side of support member 36. That is, upon engagement of the shear element 51 with the nut 53 the track 11 is moved into engagement with support member 36.

The upper end of a depending baffle 61 is secured to the brackets 44 and 46 in position to hang down in the path of movement of the sheared bolt heads whereby the momentum thereof is restrained.

From the foregoing description, the operation of my improved apparatus will be readily understood. The track 11 is conveyed intermittently through the shear apparatus 10 by actuating the air cylinder 16 and the hydraulic cylinder 18 as described hereinabove. With the bolts 53 to be sheared in alignment with the shear element 51, the platform 29 is elevated by actuating the air cylinder 32. The section of the track 11 carried by the platform 29 is thus elevated to a predetermined position whereby the upper surface of the track shoe 52 is adjacent the shear element 51. Accordingly, upon actuation of the hydraulic cylinder 54, the shear element 51 is moved transversely adjacent the upper surface of the shoe 52 to thus engage the bolt 53, as shown in FIG. 4, to thereby shear the head off the bolt. As the sheared head of the bolt moves through the air, the depending baffle 61 engages the head to thus restrain movement thereof and cause the bolt head to fall downwardly beneath the frame 26.

On large tracks 11, the shear element 51 is adapted to shear one bolt head each time the cylinder 54 is actuated. However, where smaller tracks 11 are employed, the heads of two aligned bolts may be sheared in one operation. To align the shear element 51 with the bolt head to be sheared, the arm 49 is moved to selected positions by removing the pin 48 and inserting the same in selected ones of the openings 47.

From the foregoing, it will be seen that I have devised improved apparatus for shearing track bolts of crawler-type tractors. By providing apparatus for removing the bolt heads without having to employ torches, punches and the like, I not only greatly reduce the time required to remove the bolt heads, but the track shoes are not damaged in any manner. Also, by providing apparatus which intermittently positions the track 11 in a predetermined position whereby the bolt heads to be sheared are supported on a movable platform, together with means to elevate the movable platform to a predetermined position, the bolt heads are positioned accurately for engagement by the shearing element 51 whereby a minimum of power is required to shear the bolt head and at the same time the shear element does not damage the adjacent surface of the track shoe. Furthermore, by providing a hydraulic cylinder for reciprocating the shear element transversely of and adjacent the upper surface of the track shoe in alignment with the head of the bolt to be removed, the bolt head is removed quickly immediately upon positioning the bolt head in the predetermined position.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. In apparatus for shearing a track shoe bolt carried by the track of a crawler-type tractor:
   (a) movable support means disposed to engage the under surface of said track and support a section thereof at a predetermined elevation,
   (b) a movable shear member mounted above and disposed to move transversely of and adjacent the upper surface of said section of track supported at a predetermined elevation, and
   (c) means to move said shear member transversely of said section of track whereby the head of a track shoe bolt projecting above said upper surface of the track and in the path of movement of said shear member is sheared off.

2. In apparatus for shearing a track shoe bolt as defined in claim 1 in which the movable shear member comprises:
   (a) a depending arm pivotally mounted adjacent its upper end above said support member, and
   (b) a shear element carried by the lower end of said arm in position to engage the head of a nut projecting above the upper surface of the track and in the path of movement of said shear element.

3. In apparatus for shearing a track shoe bolt as defined in claim 2 in which said upper end of the depending arm is pivotally connected by a pivot pin to an elongated bracket having a plurality of spaced apart openings therethrough for receiving said pin whereby said pin may be mounted in selected ones of said openings to support said depending arm at selected positions.

4. In apparatus for shearing a track shoe bolt as defined in claim 1 in which a flexible baffle member is supported adjacent its upper end in position to extend downwardly and be engaged by the heads sheared from said bolts whereby movement of the heads thus sheared is restrained.

5. In apparatus for shearing a track shoe bolt carried by the track of a crawler-type tractor:
   (a) a supporting frame disposed to receive and support said track,
   (b) means to convey said track to said supporting frame,
   (c) a movable support member carried by said frame in position to engage the under surface of said track and support a section thereof at a predetermined raised position,
   (d) means to move said movable support member to selected vertical positions whereby said section of the track is supported selectively at a lower position and at said predetermined raised position,
   (e) a movable shear member mounted above and disposed to move transversely of and adjacent the upper surface of said section of track while it is supported at said predetermined raised position, and
   (f) means to move said shear member transversely of said section of track whereby the head of a track shoe bolt projecting above said upper surface of the track and in the path of movement of said shear member is sheared off.

6. In apparatus for shearing a track shoe bolt as defined in claim 5 in which the means to move said shear member comprises:
   (a) a fluid pressure operated cylinder mounted on said supporting frame, (b) a piston rod projecting outwardly of said cylinder,
(c) means detachably connecting the outer end of said piston rod to said movable shear member, and
(d) resilient means interposed between said supporting frame and said movable shear member urging said shear member toward said cylinder.

7. In apparatus for shearing a track shoe bolt as defined in claim 5 in which the movable support member is raised and lowered by a fluid pressure operated cylinder.

No references cited.

ANDREW R. JUHASZ, *Primary Examiner.*